Figure 2:
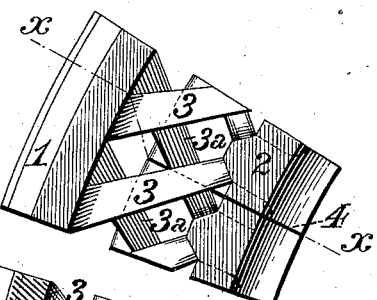

(No Model.) 4 Sheets—Sheet 1.

L. R. FAUGHT.
CHILL FOR CAR WHEELS.

No. 365,914. Patented July 5, 1887.

WITNESSES:
INVENTOR,
Att'y.

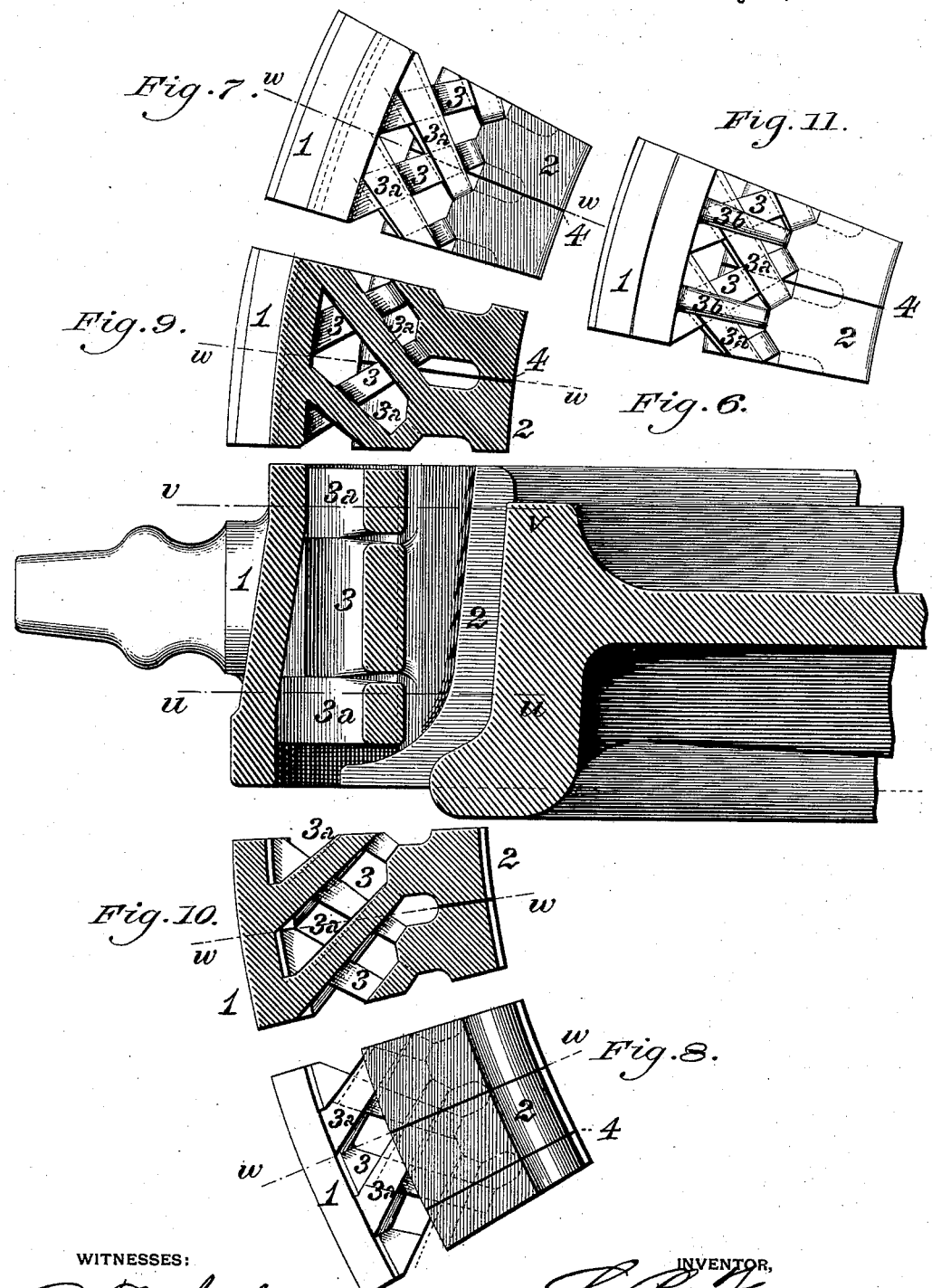

(No Model.)   4 Sheets—Sheet 3.
L. R. FAUGHT.
CHILL FOR CAR WHEELS.
No. 365,914. Patented July 5, 1887.
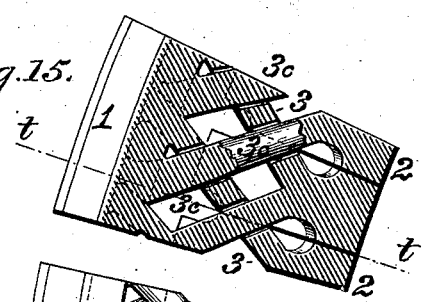
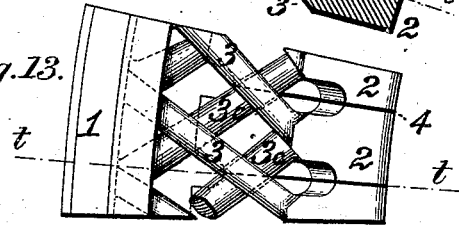
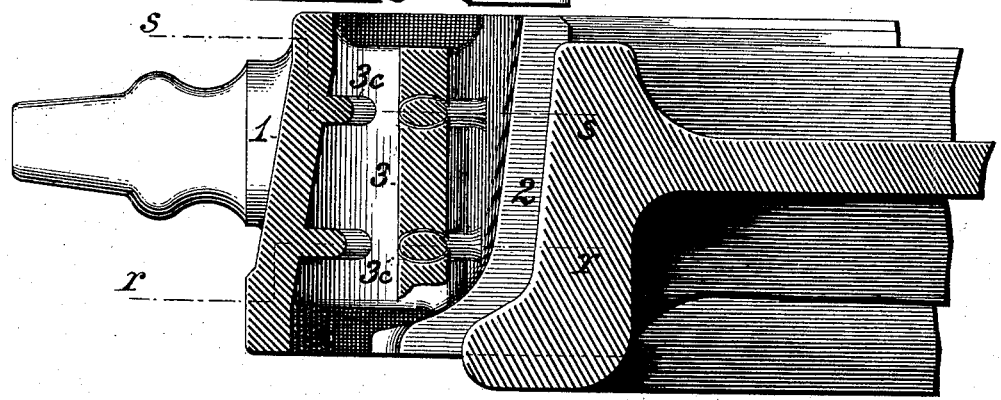
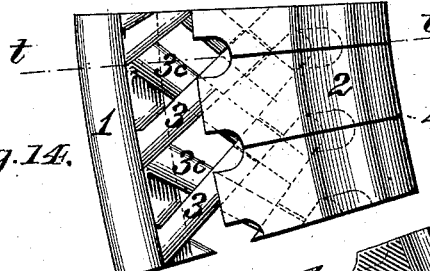
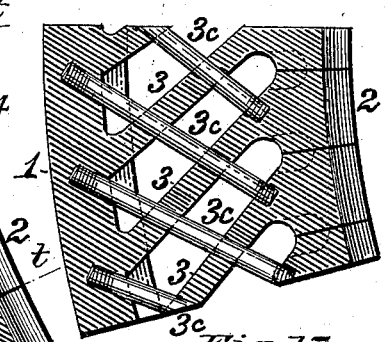
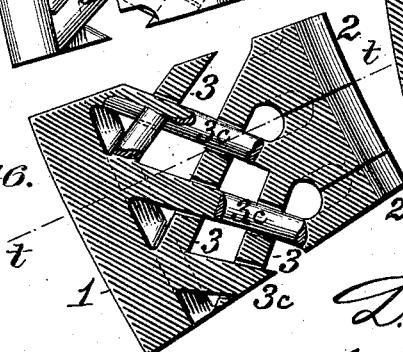
WITNESSES:
INVENTOR,
Att'y.
N. PETERS, Photo-Lithographer, Washington D. C.

(No Model.) 4 Sheets—Sheet 4.
L. R. FAUGHT.
CHILL FOR CAR WHEELS.
No. 365,914. Patented July 5, 1887.
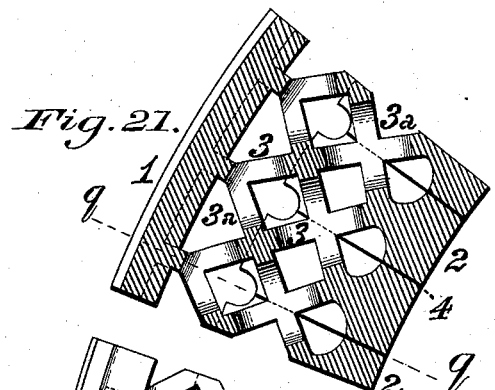
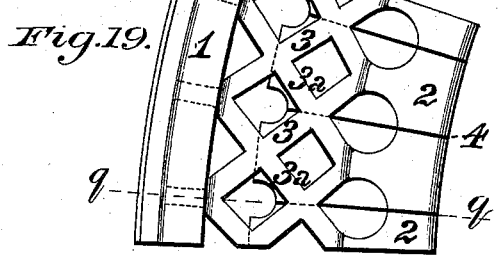
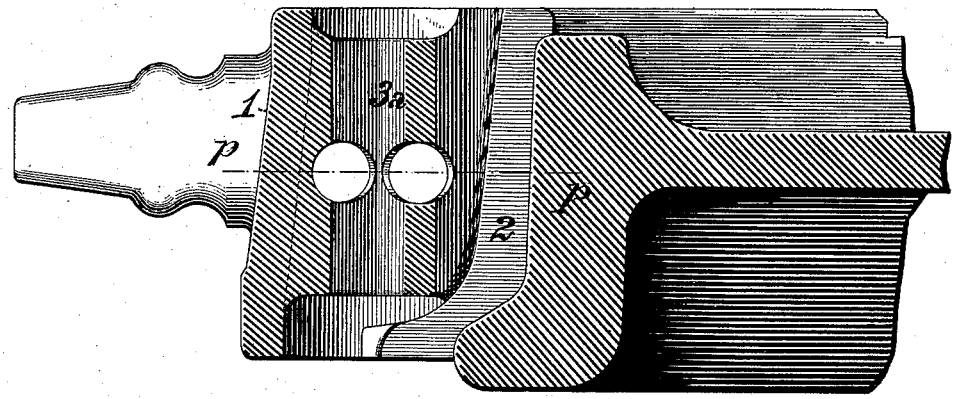
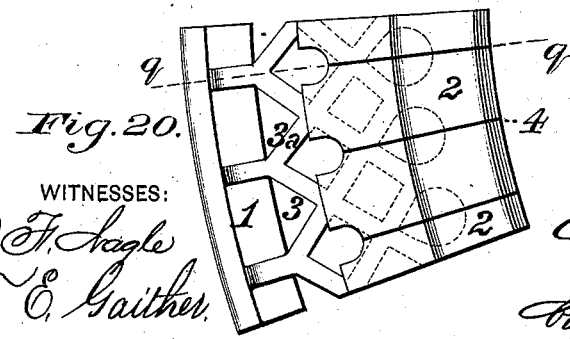
WITNESSES:
INVENTOR

UNITED STATES PATENT OFFICE.

LUTHER R. FAUGHT, OF PHILADELPHIA, PENNSYLVANIA.

CHILL FOR CAR-WHEELS.

SPECIFICATION forming part of Letters Patent No. 365,914, dated July 5, 1887.

Application filed May 11, 1887. Serial No. 237,829. (No model.)

*To all whom it may concern:*

Be it known that I, LUTHER R. FAUGHT, of the city and county of Philadelphia, in the State of Pennsylvania, have invented a certain new and useful Improvement in Chills for Car-Wheels, of which improvement the following is a specification.

My invention relates to that class of chills the governing characteristics of which are instanced in Letters Patent of the United States No. 341,326, granted and issued to me under date of May 4, 1886, which are composed of a continuous outer section or rim and a divided or segmental inner section in the form of a circular series of separate but closely-adjoining blocks or segments, united to the outer section by arms or bars, by the expansion of which, when heated by the molten metal poured into the mold in the manufacture of a chilled car-wheel, the inner section is caused to contract or be reduced in diameter by the inward movement of its segments, chills of such description being in approved use, and being known as "contracting chills." As heretofore proposed and employed, so far as my knowledge and information extends, the concentric inner and outer sections of chills of this class have been connected by a series of radial arms the length of which was equal to the width of the space intervening between the sections, each block or segment of the inner section being united by a single bar, such as last above specified, to the outer section. The thorough and effective action of all contracting chills is necessarily dependent upon the rapid and continued contraction or inward movement of their inner sections, as induced by the expansion of the connecting-bars under the influence of the heat imparted to them by the molten metal, as the principle upon which the process of chilling is based is that of suddenly cooling the metal when poured and maintaining a cooling action upon it after pouring. It therefore follows that in order to fully perform its function a chill should not only be prevented from separating its surface from that of the tread of the wheel, but should be adapted to closely follow the contraction of the wheel, which, being the source of heat, tends naturally to contract more rapidly than the chill inclosing it can expand. The capacity of inward movement, which, as above indicated, it is desirable should be as great both in rapidity and degree as is practicable, is limited in contracting chills by the length of the arms connecting the inner and outer sections, which, in the constructions heretofore employed, being radial, are the shortest that can be used. An increase of the length of radial arms for the purpose of obtaining increased expansion involves the objection of correspondingly increasing the diameter of the outer section of the chill, thus increasing its weight and cost, and requiring more floor-room and labor in molding, and further fails to attain the end desired, for the reason that the outward action of the heat of the metal in elevating the temperature of the bars is counteracted by the continually-increasing resistance of the metal of the bars and the surrounding air until a limit is reached, when the heat ceases to be capable of exerting an expansive action upon the bars.

It is the object of my invention to increase materially the capacity of contraction of the inner section of the chill without involving attendant objection, and thereby to further the production of wheels of uniform quality and regular and sufficient depth of chill throughout, as well as of truly circular contour; to which end my invention, generally stated, consists in the combination of a continuous rim or outer section, a segmental or divided inner section, and a series of arms or bars outwardly inclined in opposite directions to the center lines of the segments of the inner section and connecting in pairs or groups said segments to the outer section.

The improvement claimed is hereinafter fully set forth.

Figure 4:
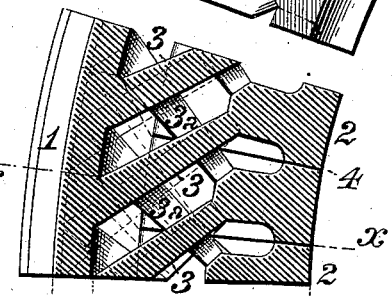
Figure 1:
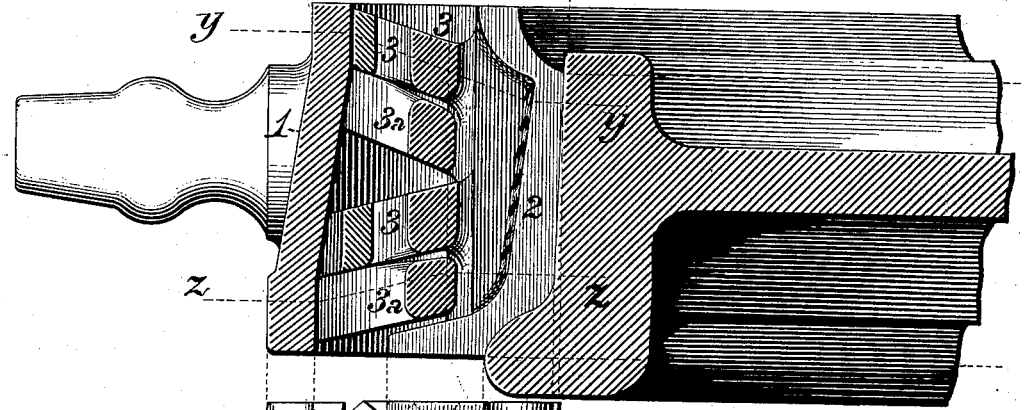
Figure 3:
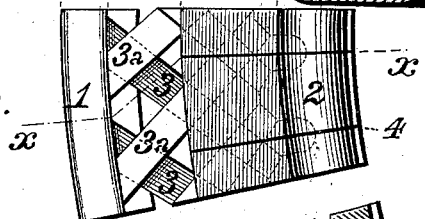
Figure 5:
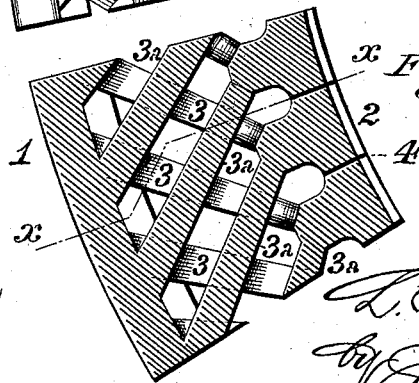

In the accompanying drawings, Figure 1 is a vertical section through a portion of a chill embodying my invention at the line *x x* of Figs. 2, 3, 4, and 5; Fig. 2, a plan or top view of a portion of the same; Fig. 3, a bottom view; Fig. 4, a partial horizontal section at the line *y y* of Fig. 1; Fig. 5, a similar section at the line *z z* of Fig. 1; Fig. 6, a vertical section through a portion of a chill, illustrating another application of my invention, at the line *w w* of Figs. 7, 8, 9, and 10; Fig. 7, a plan or top view of a portion of the same; Fig. 8, a bottom view; Fig. 9, a partial horizontal section at the line *v v* of Fig. 6; Fig. 10, a similar section at the line $u\,u$ of Fig. 6; Fig. 11, a plan view illustrating a modification of the construction shown in Figs. 6 to 10; Fig. 12, a vertical section through a portion of a chill, illustrating another application of my invention, at the line $t\,t$ of Figs. 13, 14, 15, and 16; Fig. 13, a plan or top view of a portion of the same; Fig. 14, a bottom view; Fig. 15, a partial horizontal section at the line $s\,s$ of Fig. 12; Fig. 16, a similar section at the line $r\,r$ of Fig. 12; Fig. 17, a similar section illustrating a modification of the construction shown in Figs. 12 to 16; Fig. 18, a vertical section through a portion of a chill, illustrating another application of my invention, at the line $q\,q$ of Figs. 19, 20, and 21; Fig. 19, a plan or top view of a portion of the same; Fig. 20, a bottom view, and Fig. 21 a partial horizontal section at the line $p\,p$ of Fig. 18.

In the practice of my invention I construct a chill which, as in prior instances of the class of contracting chills, is composed of a solid or continuous outer section or rim, 1, and an inner section formed of a circular series of chilling blocks or segments, 2, arranged closely adjacent one to the other, the inner surface of the ring or section formed by the series of blocks corresponding substantially with the treads of the wheels to be cast and being exposed to direct contact with the molten metal. The several blocks of the inner section are each connected to the outer section by arms or expansion-bars, the construction and combination of which, with the inner and outer sections, constitute my present invention, and which will be hereinafter fully described. The blocks or segments 2 and expansion-bars are herein shown, and are preferably cast integral with the outer section, the blocks 2 being separated one from the other by narrow radial splits or divisions 4, which may be formed either by the insertion of suitable dividing-pieces in the mold in casting the chill or by sawing out subsequently thereto. When in position for use, the chill rests upon a drag provided with a bottom plate, and a cope is placed upon its top, these members providing proper facilities for molding the wheel in the usual manner.

In lieu of connecting the blocks or segments 2 of the inner section of the chill to the outer section by single radial arms, as heretofore, each of said blocks is under my invention united to the outer section by one or more pairs or groups of arms or bars, 3, which are inclined outwardly in opposite directions from the radial center line of the segment to the outer section of the chill, and which, by their relation to the angles which they form toward the radial center lines of the segments to which they are connected, with the chords of arcs of the outer section, I term "secant expansion-bars." Each pair or group of bars forms, with the outer section, a triangle having at least two equal sides, of which a line passing through the center of the segment is the perpendicular, a portion of the outer section the base, and the two bars the equal sides. The bars 3 are secants of the two outer equal angles of this triangle, and the tangent of said angles, being a line passing through the center of the segment, is the line in which the resultant of the forces of expansion of the bars when heated is exerted. It will be seen that inward radial movement of the chill-segments is effected by the conjoint expansion of the inclined expansion-bars, united at their outer ends to the immovable outer section and at their inner meeting or adjoining ends to the movable chill-segments.

The increase under expansion of radial distance between the inner and the outer section being proportional to the tangents of the equal angles of the triangles formed by the bars and the outer section, the advantage of my improvement in attaining an increased degree of inward movement of the inner section by the conjoint action of oppositely-inclined bars will be apparent from the well-known relation existing between the increase of angles and the increase in their corresponding tangents. Without imposing any limitation upon the angles at which the bars should be set, which may properly be left to the judgment of the constructor, those illustrated may be instanced as exemplifying a desirable mean between two limits, to wit, radial lines which are the shortest possible between two concentric circles and lines which are tangents to the inner circle and halves of chords of arcs of the outer circle, the latter being the longest possible lines by which the circles can be connected. Within these two extremes is comprehended the range of application of the governing principle of my invention in effecting the utilization of the resultant of the conjoint expansion of a pair or pairs of bars to induce movement in a required direction different from that in which the expansion of the bars would be exerted if uncombined.

The several forms of chills shown in the drawings illustrate, respectively, structural modifications embodying in each instance the essential features of my invention, as above described.

Referring to Figs. 1 to 5, inclusive, each of the blocks or segments 2 of the divided inner section of the contracting chill therein shown is connected to the continuous outer section, 1, by a group or series of secant expansion-bars, 3 3$^a$, the several bars of each segment being arranged in a vertical series, and extending at alternately-opposite angles to the radial center line of the segment, so as to form angular pairs, from the segment to the outer section. The combined effort of the series of inclined expansion-bars of each segment when expanded, which in the bars severally is exerted in the direction of their length, effects, by reason of their convergence at and connection to the segment, inward movement of the segment in the direction of its radial center line. In order to render further available the advantage resultant upon an increased length of the expansion-bars, the latter are also inclined horizontally in alternately-reversed pairs, as seen in Fig. 1, their horizontal angularity tending to cause their expansive action to be exerted more effectively in connection with that of the segments, as well as increasing it by the greater length given to them. The combination of the system of inclined bars, as shown, with the inner and outer sections of the chill presents, in addition to its capacity of utilizing expansion to a high degree, a complete and effective system of cross-bracing for the chill as against the action of the alternate and material changes from low to high temperature, and vice versa, which take place when in use, and which tend to distort the chill from its normal circular form. The expansion-bars may be formed by coring in short sections or divisions having interstices systematically arranged, so that when the segment-cores are set in the mold adjoining the same and each other the several members shall be cast in proper relation and connection. The slots or divisions which separate the segments of the inner section may be formed by placing suitable pieces of refractory material in the cores, or be subsequently cut by sawing or grinding.

Figs. 6 to 10 illustrate an application of my invention corresponding in principle with that above described, but differing structurally therefrom in the particular that each segment of the inner section of the chill is connected to the outer section by three secant expansion-bars arranged vertically one above another, the central bar, 3, the depth and transverse section of which is substantially equal to the aggregate of the corresponding measures of the upper and lower bars, 3ª, being outwardly inclined in one direction from the radial center line of the segment, and the upper and lower bars being correspondingly inclined therefrom in the opposite direction. A further difference exists in that the expansion-bars are not double inclined—that is to say, their inclination is in vertical planes only, instead of in both vertical and horizontal planes, as in the former instance. The above construction, while suitable for use in broad chills or those designed for casting broad-tread wheels, is particularly adaptable to chills of reduced section, as required for wheels having narrow treads, as those employed on tramways or city passenger-railways. The conjoint action of the oppositely-inclined expansion-bars is exerted similarly to that developed in the chill first described, and the lesser number of bars connected with each segment renders the construction more convenient where the segments are of reduced depth.

In the modification shown in Fig. 11 the segments of the inner section are connected at bottom to the outer section by secant expansion-bars 3 3ª in the manner first described, and shown in Figs. 1 to 5, and are connected at top to the outer section by single radial expansion-bars 3ᵇ. As it is not essential that the capacity of contraction of the inner section of the chill should be as great at its top as at the portion corresponding with the flange and throat of the wheel, this construction can be adopted in some instances with a sufficient attainment for practical purposes of the result designed to be accomplished by my improvement.

The construction illustrated by Figs. 12 to 17 is another instance of an application of my invention, which differs in structure, while according in principle, with that first described and shown. In this, as in the preceding cases, each of the segments 2 of the inner section is connected by a series of secant expansion-bars, 3 3ᶜ, with the outer section, the bar 3 being outwardly inclined in one direction from the radial center line of the segment, and the bars 3ᶜ being correspondingly inclined in the opposite direction. The bar 3, which is substantially of elongated rectangular form, may extend throughout the entire depth of the segment, or preferably, as shown, be made of less depth, with its upper and lower faces wholly within and clear of the parting faces of the chill, its construction in this particular according with that set forth in an application for Letters Patent filed by me April 7, 1887, Serial No. 234,065, and not being claimed as of my present invention. The two bars 3ᶜ, which are inclined in the opposite direction to the bar 3, may be of elliptical, circular, or rectangular section, and pass through the bar 3 at short distances from its upper and lower faces, respectively, being separated from the bar 3 at their intersection therewith by the insertion of thin cores or sheets of refractory material in the mold preparatory to casting the chill. It will be obvious that, if desired, a single bar, 3ᶜ, passing freely through the bar 3 at or near its horizontal center line, may be substituted for the two bars shown; and, further, that the bar or bars 3ᶜ may be formed of malleable metal—as iron, steel, or brass—being in such case provided with threaded or serrated ends, so as to be firmly joined to the cast-iron of the chill-sections in the operation of casting the chill. Bars 3ᶜ of such character are shown in the horizontal section, Fig. 17.

An application of my invention involving a further structural variation is shown in Figs. 18 to 21. In this case each segment 2 of the inner section of the chill is connected to the outer section, 1, by two secant expansion-bars, 3 3ª, which, as in the previous instances, are inclined outwardly and in opposite directions from the radial center line of the segment, and extend from a central line of junction thereon to the adjacent face of the outer section. The bars 3 3ª may, as in the construction last described, either extend throughout the entire depth of the segments or be made of less depth, so as to be clear at top and bottom of the parting faces of the chill, and each of the bars is intersected by and connected to the reversely-inclined bar or bars of the adjoining or the adjoining and next adjacent segments, thus forming a reticulated system of bracing and counterbracing between the inner and outer sections of the chill, which greatly enhances its strength and endurance, and by the connected relation of the expansion-bars of the several segments promotes their action in effecting the contraction or inward movement of the inner section.

Chills of the above construction will be found desirably applicable for castings of comparatively large diameters—as tires for locomotive driving-wheels, both flanged and flat, and also for rolls having broad flat faces—while they may likewise, by proper modification or structure, be employed in the manufacture of narrow-faced chilled wheels.

As is indicated by the several forms of application of my invention herein described and shown, various structural modifications, which will readily occur to those skilled in the art, may be made without departing from the spirit of my invention. I do not therefore limit myself to any specific number, angle of inclination, or form of transverse section of the secant expansion-bars, and I comprehend within my invention the employment of bars having a greater or less degree of curvature, as well as the straight bars illustrated. The term "secant expansion-bars" is used by me herein to designate bars connecting the inner and outer sections of the chill, and inclined at an acute angle to a straight line joining any pair of bars at the ends thereof which unite with the outer section.

The result which my invention is designed to attain will be accomplished in accordance with its fundamental principle under any construction in which expansion-bars are located in a position other than radial to the chill, so that they may meet in or closely approximate to vertical central planes on the segments and be separated one from another to a greater or less degree at their points of connection with the outer section, in order that the conjoint expansive action of a pair or group of expansion-bars in two different directions may be exerted to effect inward movement of a segment in a radial line.

I claim as my invention, and desire to secure by Letters Patent—

1. The combination, in a chill, of a continuous rim or outer section, a segmental or divided inner section, and a series of secant expansion-bars connecting the segments of the inner section with the outer section, substantially as set forth.

2. The combination, in a chill, of a continuous rim or outer section, and an inner section composed of a series of blocks or segments, each connected to the outer section by two or more expansion-bars, which are outwardly inclined in different directions respectively from the segment to the outer section, substantially as set forth.

3. The combination, in a chill, of a continuous rim or outer section, a segmental or divided inner section, and a series of pairs or groups of outwardly and oppositely inclined expansion-bars, the members of each pair or group being located vertically one above another and extending from a segment of the inner section of the chill to the outer section thereof, substantially as set forth.

4. The combination, in a chill, of a continuous rim or outer section, a segmental or divided inner section, and a series of pairs or groups of expansion-bars, the members of each pair or group extending from a segment of the inner section of the chill to the outer section thereof, and being outwardly inclined in opposite directions to the radial center of a segment, and also inclined relatively to a horizontal plane passing through the chill, substantially as set forth.

5. The combination, in a chill, of a continuous rim or outer section, a segmental or divided inner section, a series of pairs of outwardly and oppositely inclined expansion-bars, each connecting a segment of the inner section near its lower side to the outer section, and a series of expansion-bars each extending in substantially radial direction from a segment near its upper side to the outer section, substantially as set forth.

6. The combination, in a chill, of a continuous rim or outer section, a segmental or divided inner section, and a series of pairs or groups of outwardly and oppositely inclined expansion-bars, each connecting a segment of the inner section to the outer section, one or more of the bars of each pair or group being formed of a piece of metal other than that of which the balance of the chill is composed, and being secured therein in the process of casting, substantially as set forth.

LUTHER R. FAUGHT.

Witnesses:
CHAS. E. PANCOAST,
MATTHEW GASS.